(12) United States Patent
Kawasaki

(10) Patent No.: US 7,803,208 B2
(45) Date of Patent: Sep. 28, 2010

(54) DUST COLLECTING MECHANISM

(75) Inventor: Nozomu Kawasaki, Takatsuki (JP)

(73) Assignee: Techno Takatsuki Co., Ltd., Osaku-Fu (JP)

( * ) Notice: Subject to any disclaimer, the term of this patent is extended or adjusted under 35 U.S.C. 154(b) by 398 days.

(21) Appl. No.: 11/863,418

(22) Filed: Sep. 28, 2007

(65) Prior Publication Data

US 2008/0236116 A1   Oct. 2, 2008

(30) Foreign Application Priority Data

Sep. 28, 2006   (JP) .............................. 2006-264901

(51) Int. Cl.
*B01D 45/00*   (2006.01)
(52) U.S. Cl. .......................... 55/446; 55/434; 55/442; 55/444; 55/445; 55/464; 55/465; 95/267; 95/272; 96/385
(58) Field of Classification Search .................. 55/434, 55/442, 444–446, 462, 464–465; 95/267, 95/272; 96/385
See application file for complete search history.

(56) References Cited

U.S. PATENT DOCUMENTS

| | | | | |
|---|---|---|---|---|
| 1,767,089 A * | 6/1930 | Miller et al. | ................... | 95/218 |
| 1,769,071 A * | 7/1930 | Raney | ......................... | 261/107 |
| 1,773,073 A * | 8/1930 | Beach | ......................... | 55/441 |
| 2,015,680 A * | 10/1935 | Kermer | ........................ | 159/31 |
| 2,101,418 A * | 12/1937 | Waldvogel | ................... | 55/436 |
| 2,126,236 A * | 8/1938 | Westin | ........................ | 55/434.4 |
| 2,379,795 A * | 7/1945 | Fenn | ............................. | 96/336 |
| 2,661,605 A * | 12/1953 | Liggett et al. | ................. | 62/192 |
| 2,924,292 A * | 2/1960 | Hickman | ..................... | 202/182 |
| 3,220,118 A * | 11/1965 | Isch-Wall et al. | ............. | 34/591 |
| 3,315,445 A * | 4/1967 | De Seversky | ................. | 96/53 |
| 3,387,889 A * | 6/1968 | Ziemba et al. | ................ | 299/12 |
| 3,957,468 A * | 5/1976 | Voth et al. | .................... | 96/358 |
| 4,305,548 A * | 12/1981 | Miner et al. | .................. | 237/67 |
| 4,344,843 A | 8/1982 | Liefeld | | |
| 4,419,107 A * | 12/1983 | Roydhouse | .................... | 95/59 |
| 4,832,715 A * | 5/1989 | Naruse | ......................... | 96/221 |
| 4,970,753 A * | 11/1990 | Herron, Jr. | ................... | 15/326 |

(Continued)

FOREIGN PATENT DOCUMENTS

DE   30 06 831 A1   9/1981

(Continued)

OTHER PUBLICATIONS

Supplementary European Search Report; Application No. EP 07 11 7055; Date of Completion: Sep. 17, 2009.

*Primary Examiner*—Jason M Greene
*Assistant Examiner*—Dung Bui
(74) *Attorney, Agent, or Firm*—Antonelli, Terry, Stout & Kraus, LLP.

(57) ABSTRACT

A dust collecting mechanism for an air pump, in particular, an electromagnetic vibrational pump having a compact structure, capable of realizing the efficiency of dust collecting ability is disclosed. The mechanism is simple in assembly work. An inlet and an outlet for fluid are provided in the mechanism at a barrier chamber of the mechanism provided in at least one portion of a housing. A plurality of cross walls at which 1 or 2 or more of vent holes are provided are arranged in the mechanism. At least the position of the vent hole of the adjacent cross wall is different among a plurality of the cross walls.

13 Claims, 18 Drawing Sheets

U.S. PATENT DOCUMENTS

| | | |
|---|---|---|
| 5,626,651 A | 5/1997 | Dullien |
| 5,912,368 A * | 6/1999 | Satarino et al. ............... 55/320 |
| 6,099,649 A * | 8/2000 | Schmitt et al. .............. 118/715 |
| 6,368,372 B1 * | 4/2002 | Whalen ..................... 55/385.2 |
| 6,540,803 B2 * | 4/2003 | Whalen ..................... 55/385.1 |
| 6,966,936 B2 * | 11/2005 | Yamasaki et al. .......... 55/385.2 |
| 7,105,040 B2 * | 9/2006 | Fisher et al. .................. 95/267 |
| 7,141,095 B2 * | 11/2006 | Aitchison et al. ............. 95/273 |
| 7,569,094 B2 * | 8/2009 | Kane et al. ..................... 95/28 |
| 2003/0150198 A1 * | 8/2003 | Illingworth et al. ........... 55/406 |
| 2004/0025483 A1 * | 2/2004 | Norman ....................... 55/444 |
| 2007/0175188 A1 * | 8/2007 | Tsuji ........................... 55/444 |

FOREIGN PATENT DOCUMENTS

| | | |
|---|---|---|
| GB | 2 417 218 A | 2/2006 |
| JP | 01 129548 U | 9/1989 |
| JP | 03242214 A * | 10/1991 |
| JP | 2004-76727 | 3/2004 |
| JP | 2004 076727 A | 3/2004 |

\* cited by examiner

FIG. 10
(a) 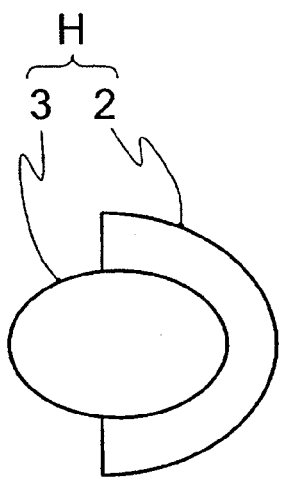
(b) 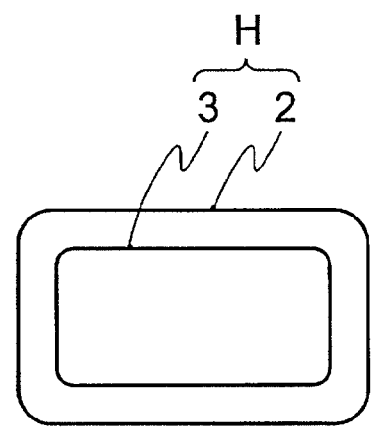
(c) 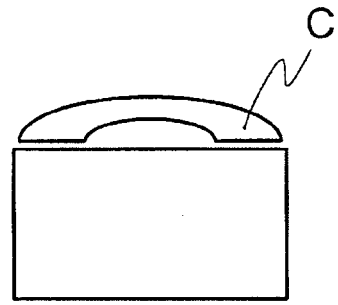

FIG. 11
(a) 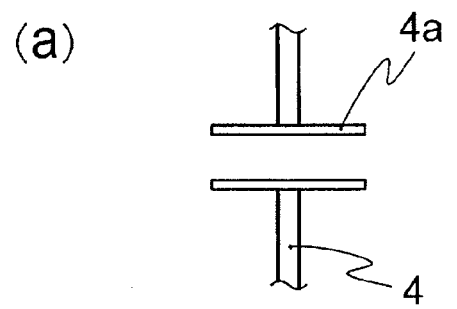
(b) 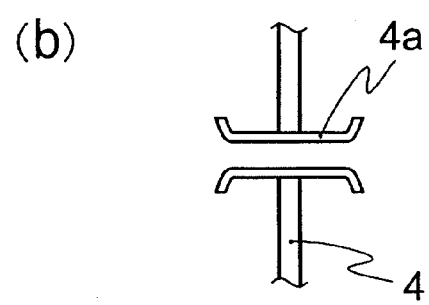
(c) 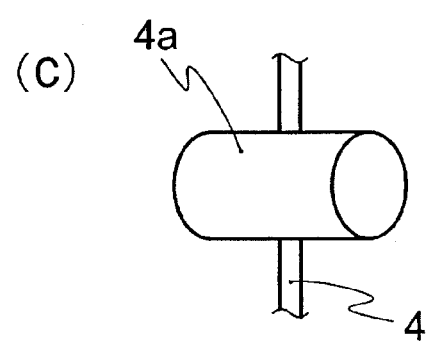
(d) 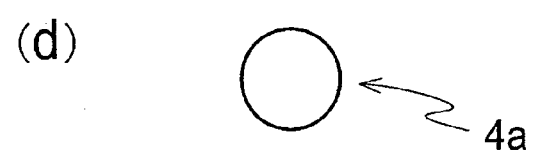
(e) 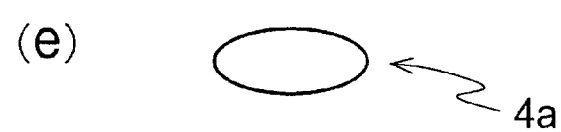

FIG. 14
(a)
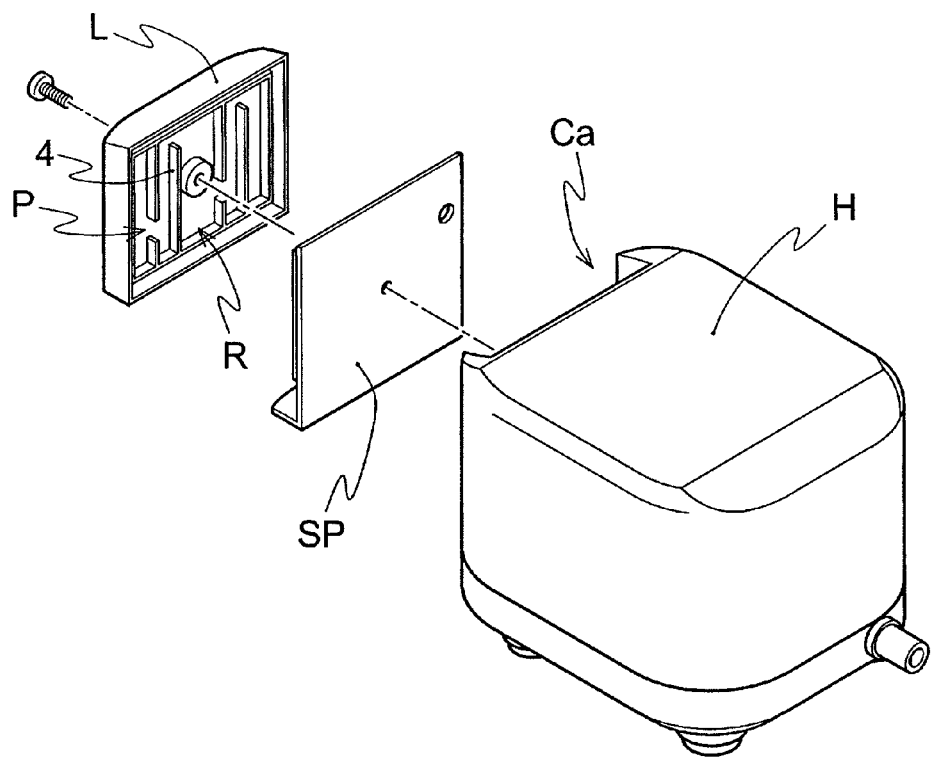
(b)
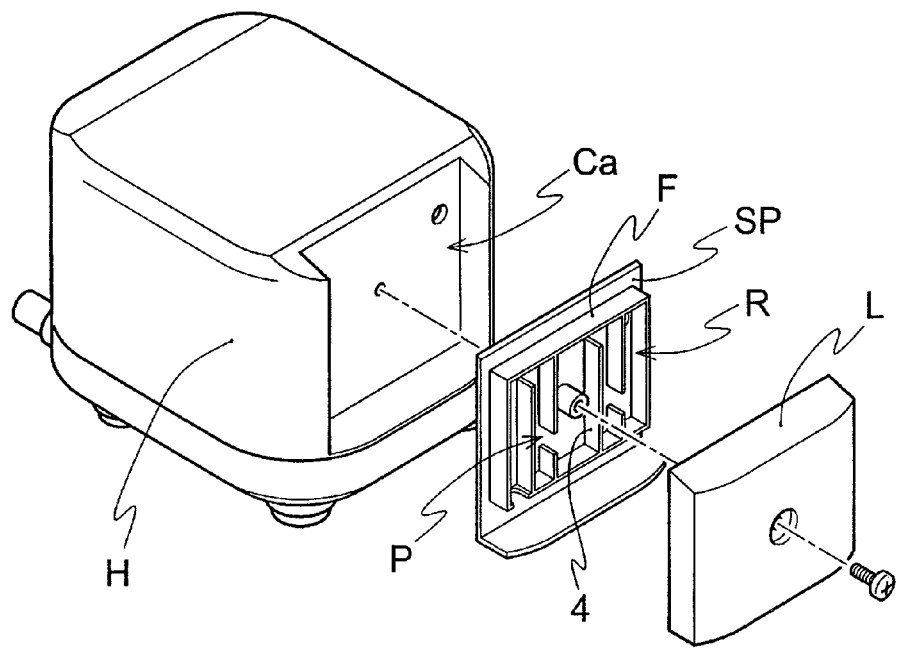

FIG. 15
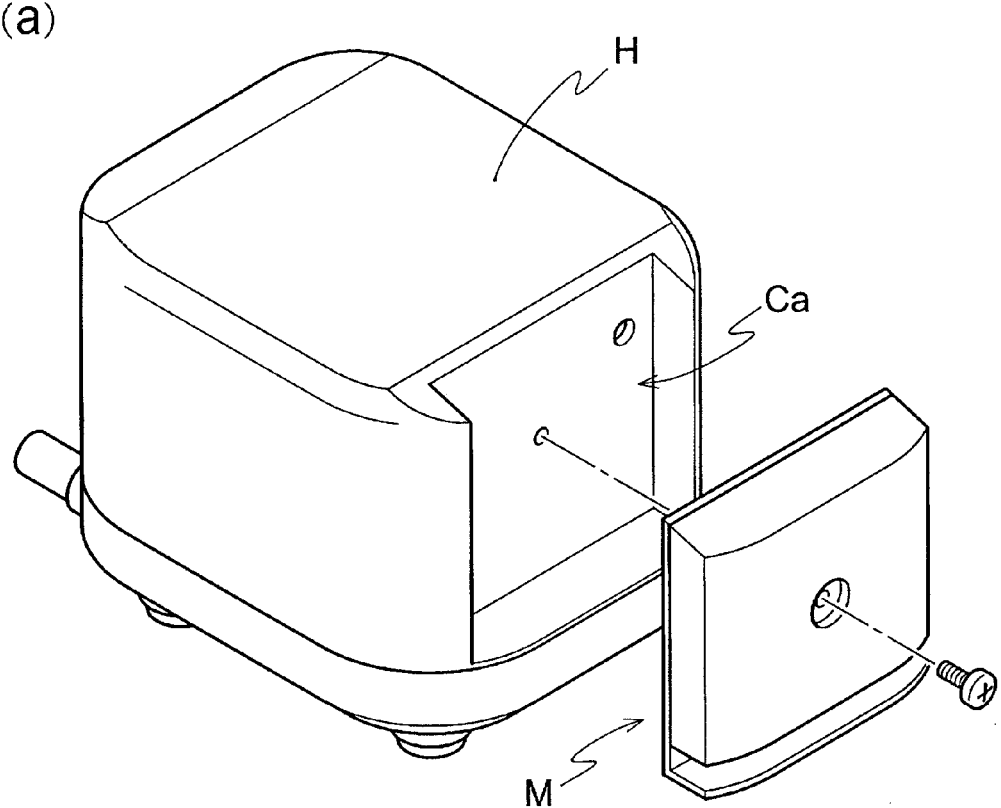
(a)
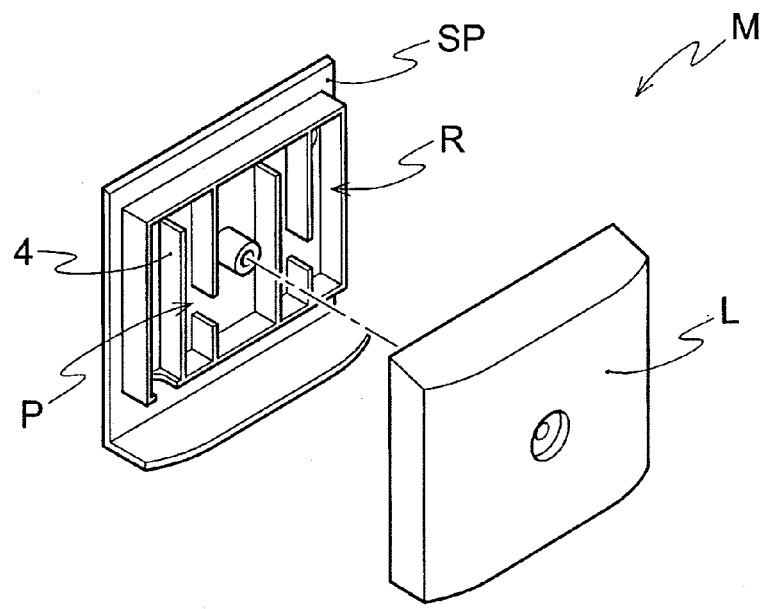
(b)

DUST COLLECTING MECHANISM

BACKGROUND OF THE INVENTION

The present invention relates to a dust collecting mechanism for an air pump. More specifically, the present invention relates to the dust collecting mechanism for an electromagnetic vibrating air pump that is mainly utilized for supplying oxygen to a home septic tank and a water bath for fish culture. However, the dust collecting mechanism of the present invention is not limited to application to specific type air pump (electromagnetic vibrating air pump) but can be applied to a general air pump.

As a pump related to a conventional technology, a diaphragm pump shown in FIGS. 17 and 18 is disclosed (refer to Japanese Unexamined Patent Publication No. 2004-76727). Further, the diaphragm pump of FIG. 18 is constituted with an electromagnet arranged facing a frame in a pump housing 200, a transducer equipped with a permanent magnet, a diaphragm linked with the both end of the transducer and a pump casing portion respectively fixed at both end sides of the frame. Further, the upper portion of the pump housing 200 is provided with a dust collecting portion 201 for suction while removing dust and dirt in atmosphere. The dust collecting portion 201 is constituted with a filter 203 being the nonwoven fabric of synthetic fiber, filter packings 204 and a filter cover 205 that are in turn provided in a nearly square or nearly circular dust collecting chamber 202 formed in the pump housing 200. Further, an intake Su for sucking air is provided on the upper bottom face of the above-mentioned dust collecting chamber 202, intakes 206 of air in atmosphere are formed between the filter packings 204 covered with the filter cover 205. In case of the pump, the nonwoven fabric of synthetic fiber is provided for removing dust and dirt in atmosphere, but it is necessary to narrow the mesh of a filter in order to remove small dust and dirt; therefore, the clogging of the filter is easily generated. When the continuous operation of the pump is carried out in the maintenance works of frequent rinsing and exchanging of the filter and in a clogged state, there occur problems that a flow rate is lowered and the pump provokes abnormal exothermic heat to result in leading to reduction in the life of the pump and claims from users.

In case of the electromagnetic vibrational air pump described in the above-mentioned Japanese Unexamined Patent Publication No. 2004-76727 (refer to FIG. 17), there are problems that dead space is enlarged, miniaturization is impossible and it costs high.

SUMMARY OF THE INVENTION

It is the object of the present invention to provide a dust collecting mechanism for an air pump (in particular, electromagnetic vibrational pump) having a compact structure, capable of realizing the efficiency of dust collecting ability, simple in assembly work and maintenance and capable of the reduction of cost.

Further, in case of piston type and diaphragm type electromagnetic vibrating pumps, the lowering of performance and the lowering of pump function caused by the abrasion and damage of a piston, the breakage of diaphragm and the damage of a valve dominate the life of the pump. Dusts and foreign articles (for example, hard and sharp minute foreign articles) contained in fluid flown in atmosphere or from the external portion of the pump are factors for lowering lifetime by which damage and breakage for a piston and a diaphragm and the damage and breakage for a valve are remarkable. It is an object of the present invention to provide fluid that is purified by removing dust and foreign articles included in the fluid flown in atmosphere or from the external portion of the pump, to the pump portion at a posterior stage.

The dust collecting mechanism for an air pump related to the first mode of the present invention is characterized in that the inlet and outlet of fluid are provided at a barrier chamber provided in at least one portion of a housing, a plurality of cross walls at which 1 or 2 or more of vent holes are provided are arranged, and at least the position of the vent hole of the adjacent cross wall is different among a plurality of the cross walls.

Further, the barrier chamber may be detachably provided.

The dust collecting mechanism of an air pump related to the second mode of the present invention is a dust collecting mechanism of an air pump, equipped with a housing having a double structure comprising an inner cover and an outer cover, providing space between the outside face of the inner cover and the inside face of the outer cover, providing the inlet and outlet of fluid and providing a plurality of cross walls at which 1 or 2 or more of vent holes are provided are arranged at the outside face of the inner cover and the inside face of the outer cover, wherein at least the position of the vent hole of the adjacent cross wall is different among a plurality of the cross walls, and the space between the outside face of the inner cover and the inside face of the outer cover, a plurality of cross walls and the vent holes move the vent channel of fluid in a zigzag direction to demarcate the obstacle of the vent channel.

Further, 1 or 2 or more of opening portions and drift portions are preferably provided at a vent channel in the barrier chamber. Further, deflection plates may be provided at the drift portions.

The dust collecting mechanism for an electromagnetic vibrational air pump related to the third mode of the present invention is characterized in that it is equipped with a housing having a double structure comprising an inner cover and an outer cover, provides space between the outside face of the inner cover and the inside face of the outer cover, demarcates in the space a nearly columnar or nearly angular tube vent channel at which the inlet and outlet of fluid are provided, and provides a 1 or 2 or more of opening portions and the drift portions in the vent channel.

Further, deflection plates are preferably provided at the drift portions.

Further, the opening portions and the drift portions are preferably provided mutually facing.

Further, the vent channel can function as a heat release means.

Further, the vent channel can function as a noise reduction means.

Further, both of the outside face of the inner cover and the inside face of the outer cover have preferably wave curve shape.

According to the dust collecting mechanism of the present invention, since the vent channel is formed so as to move in a zigzag direction in the barrier chamber provided at least one portion of the housing of a pump, difference can be generated in flow rate when the fluid flown in the pump passes the zigzag vent channel, and as a result, turbulent flow is generated. Dust collecting action is obtained by the gravity and dropping of dust caused by the generation of the turbulent flow.

Further, according to the present invention, since the zigzag vent channel satisfying the IP33 or IP34 of protective grade by the outer shell of an electric mechanical instrument prescribed in IEC (International Electrotechnical Commission) 60529 (in other word, having a structure preventing not only the invasion of rain but also the invasion of dust) is demarcated in the barrier chamber provided at least one portion of the housing, excessive space for the dust collecting mechanism is not necessary; therefore a compact structure can be realized and an electromagnetic vibrational air pump simple in assembly work can be provided.

BRIEF DESCRIPTION OF THE DRAWINGS

FIG. 10 is an illustrative view showing the concept of the dust collecting mechanism of the present invention;

FIG. 11 is an illustrative view showing a mode of a channel applied to the dust collecting mechanism of the present invention;

FIG. 14 is an illustrative view of an air pump to which the dust collecting mechanism related to still another mode of the present invention is provided;

FIG. 15 is an illustrative view of an air pump to which the dust collecting mechanism related to yet another mode of the present invention is provided;

DETAILED DESCRIPTION

Figure 1:
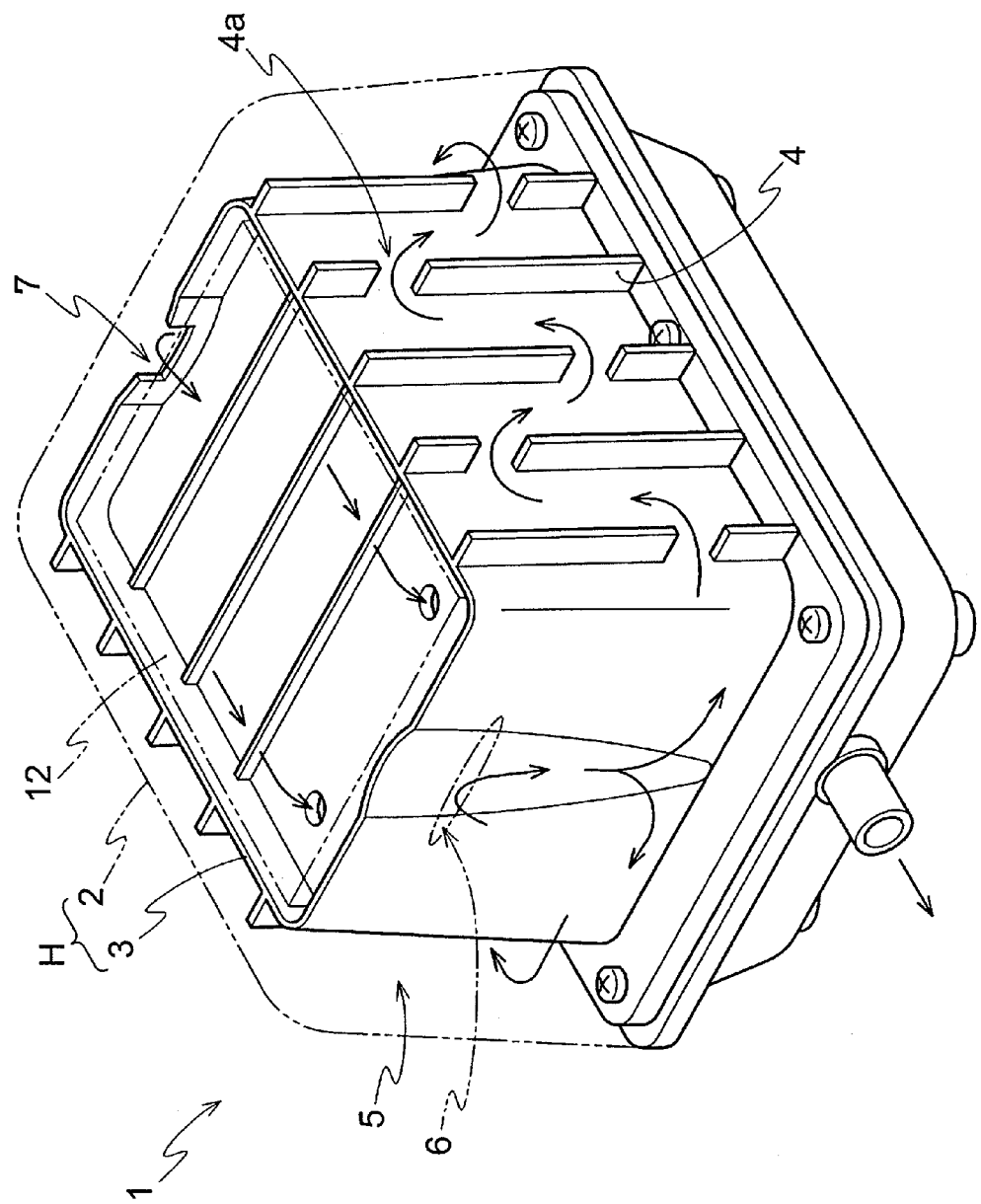
FIG. 1 is an illustrative view showing an electromagnetic vibrational air pump to which the dust collecting mechanism related to the embodiment of the present invention is applied.
Figure 2:
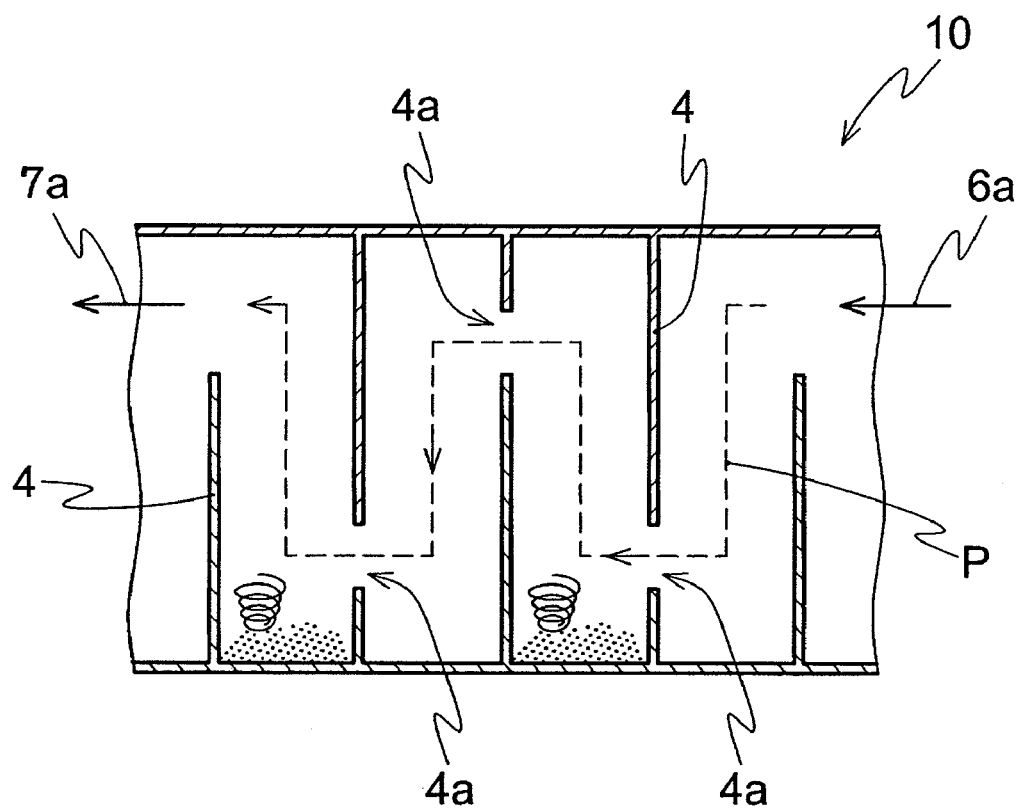
FIG. 2 is a side illustrative view showing an example of the dust collecting mechanism of the present invention.
Figure 3:
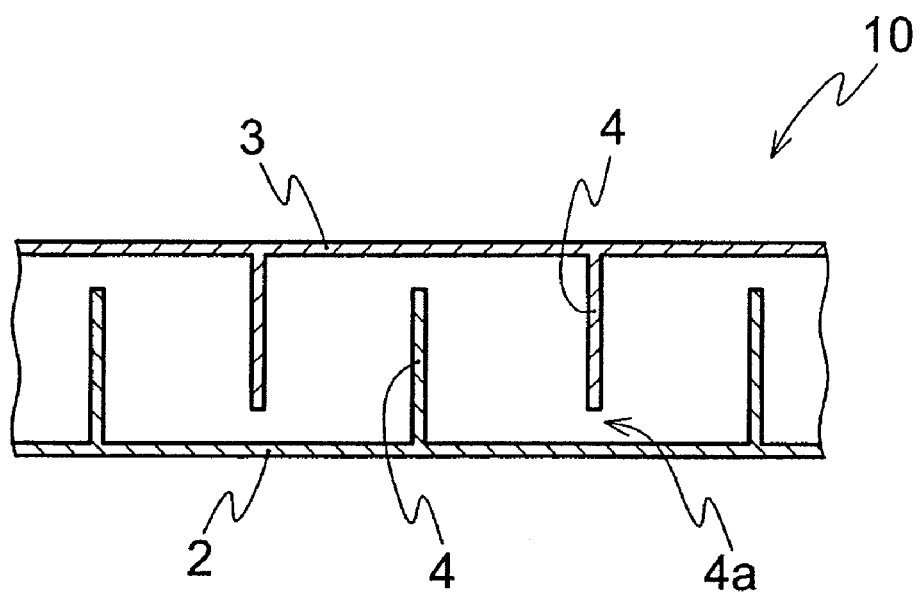
FIG. 3 is a top illustrative view showing another example of the dust collecting mechanism of the present invention.
Figure 4:
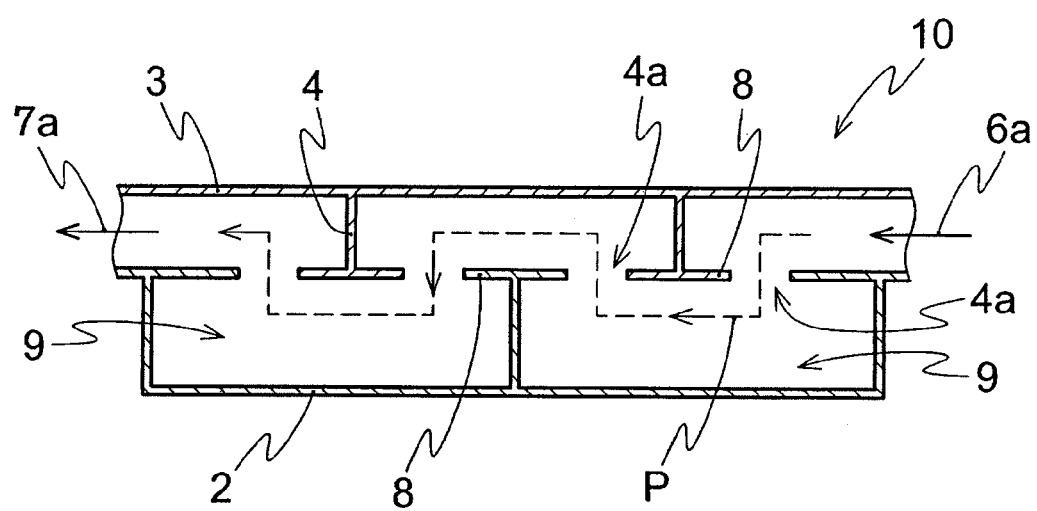
FIG. 4 is a top illustrative view showing still another example of the dust collecting mechanism of the present invention.
Figure 5:
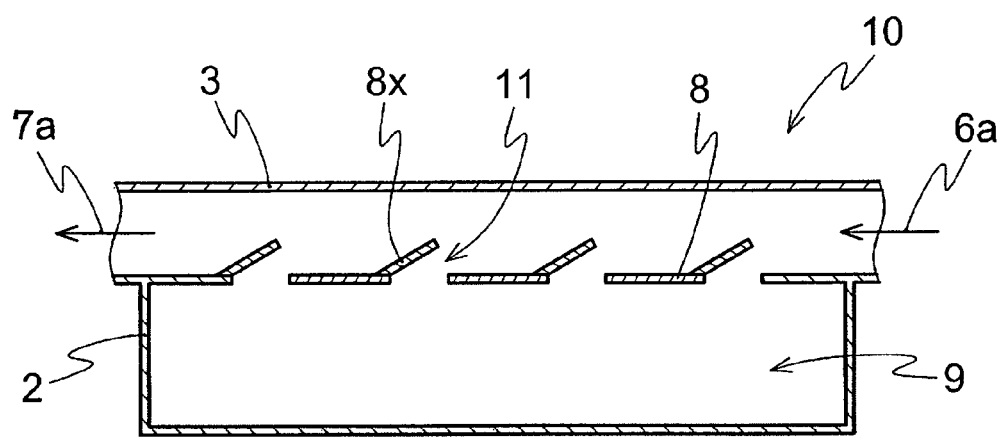
FIG. 5 is a top illustrative view showing yet another example of the dust collecting mechanism of the present invention.
Figure 6:
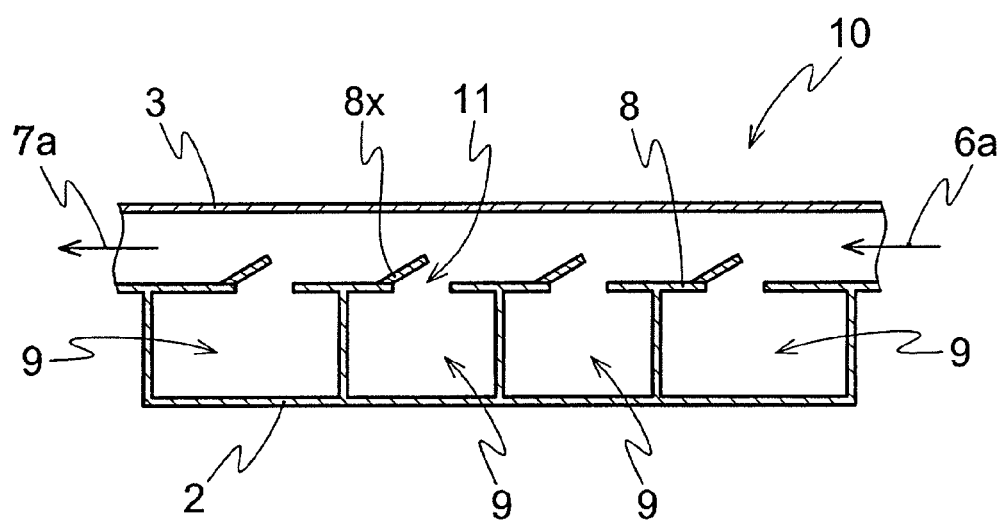
FIG. 6 is a top illustrative view showing yet another example of the dust collecting mechanism of the present invention.
Figure 7:
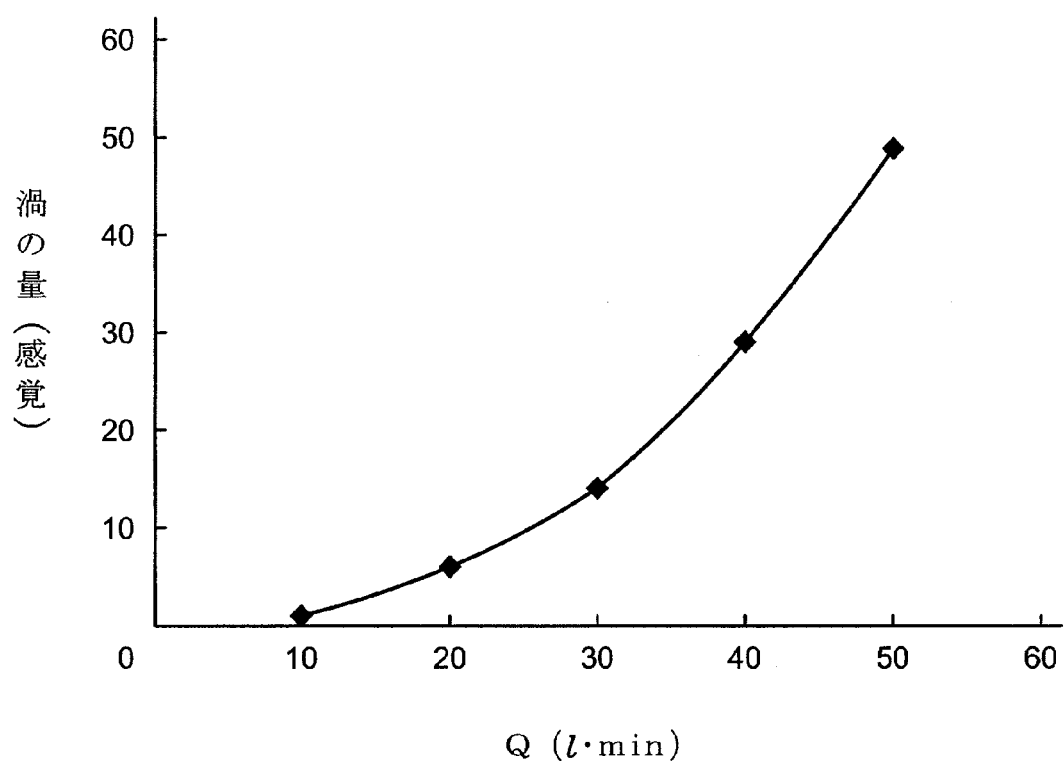
FIG. 7 is a graph showing relation between flow rate and vortex quantity.
Figure 8:
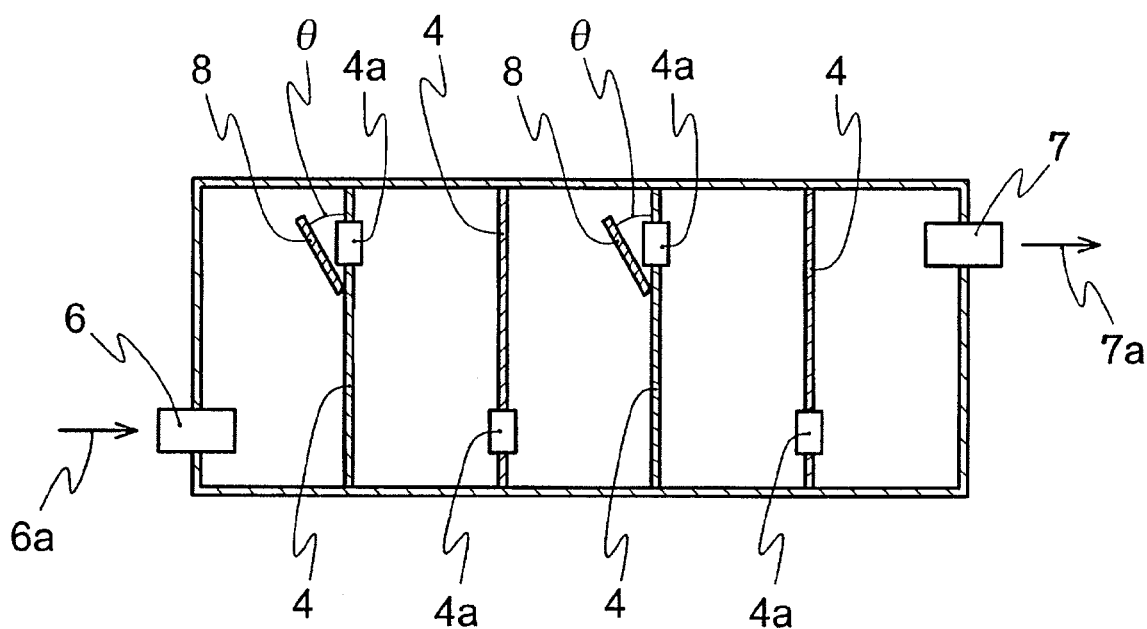
FIG. 8 is a side illustrative view showing yet another example of the dust collecting mechanism of the present invention.
Figure 9:
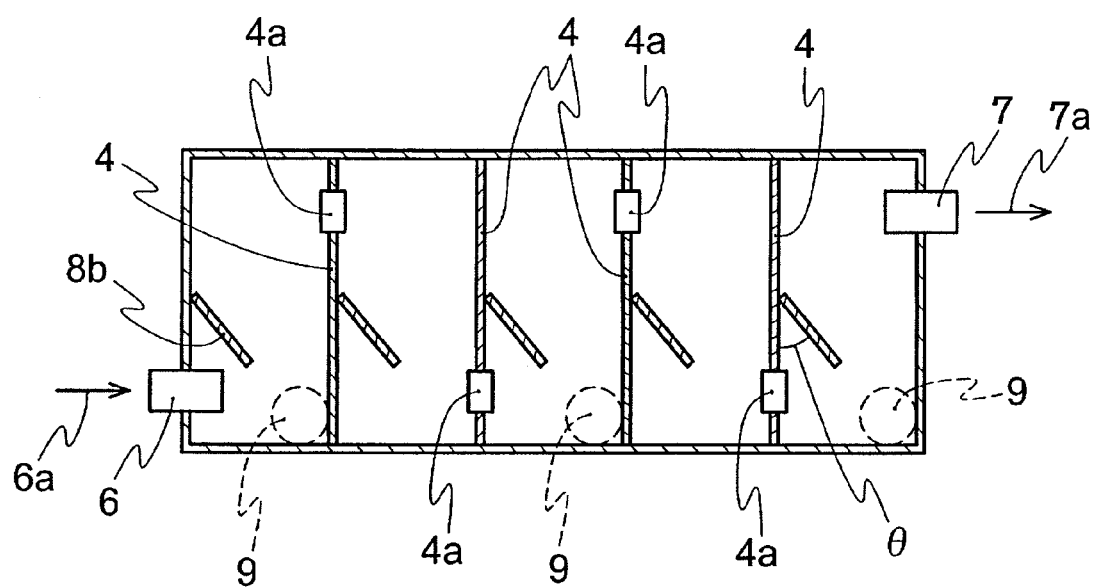
FIG. 9 is a side illustrative view showing yet another example of the dust collecting mechanism of the present invention.
Figure 12:
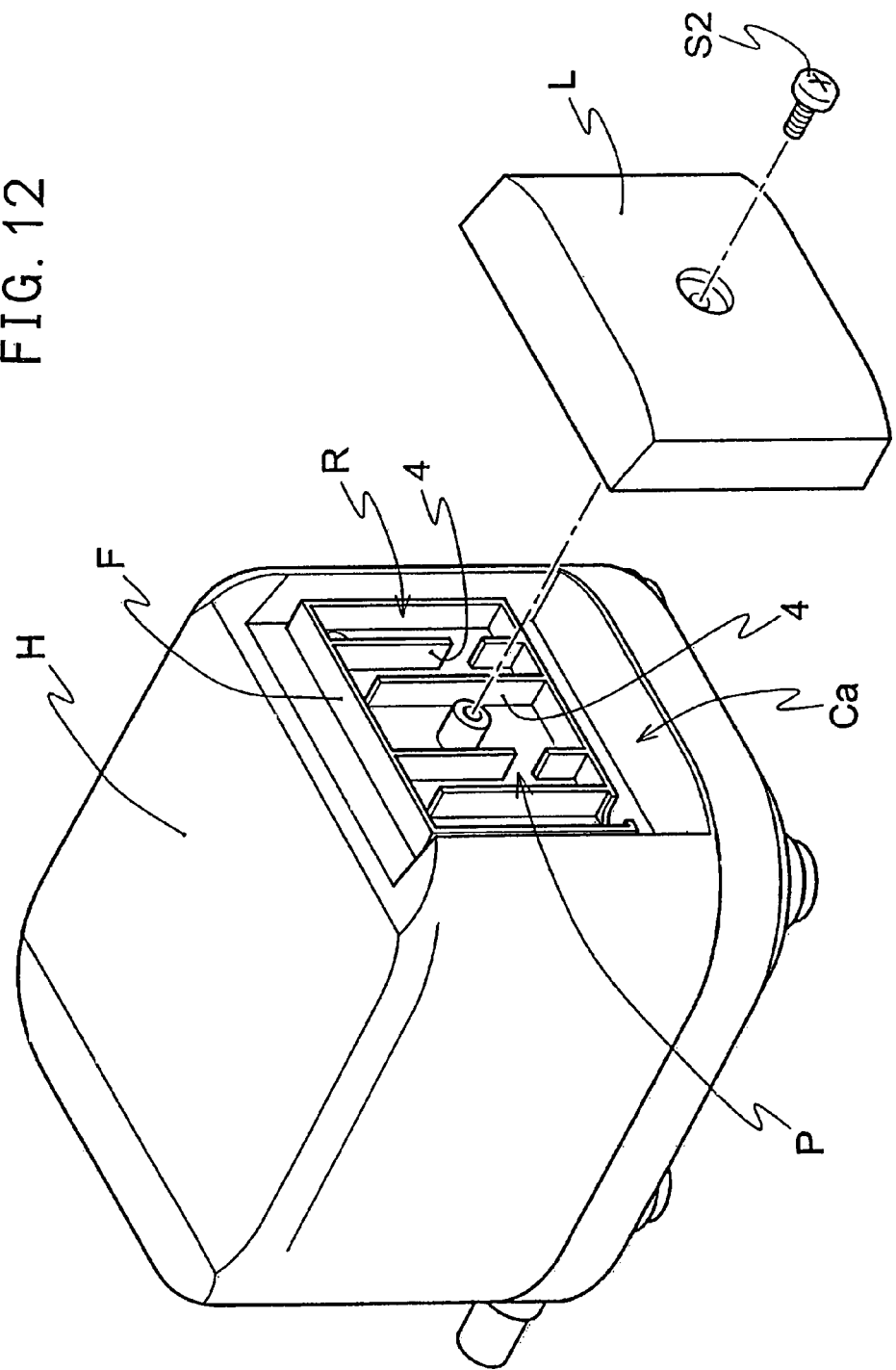
FIG. 12 is an illustrative view of an air pump to which the dust collecting mechanism related to one mode of the present invention is provided.
Figure 13:
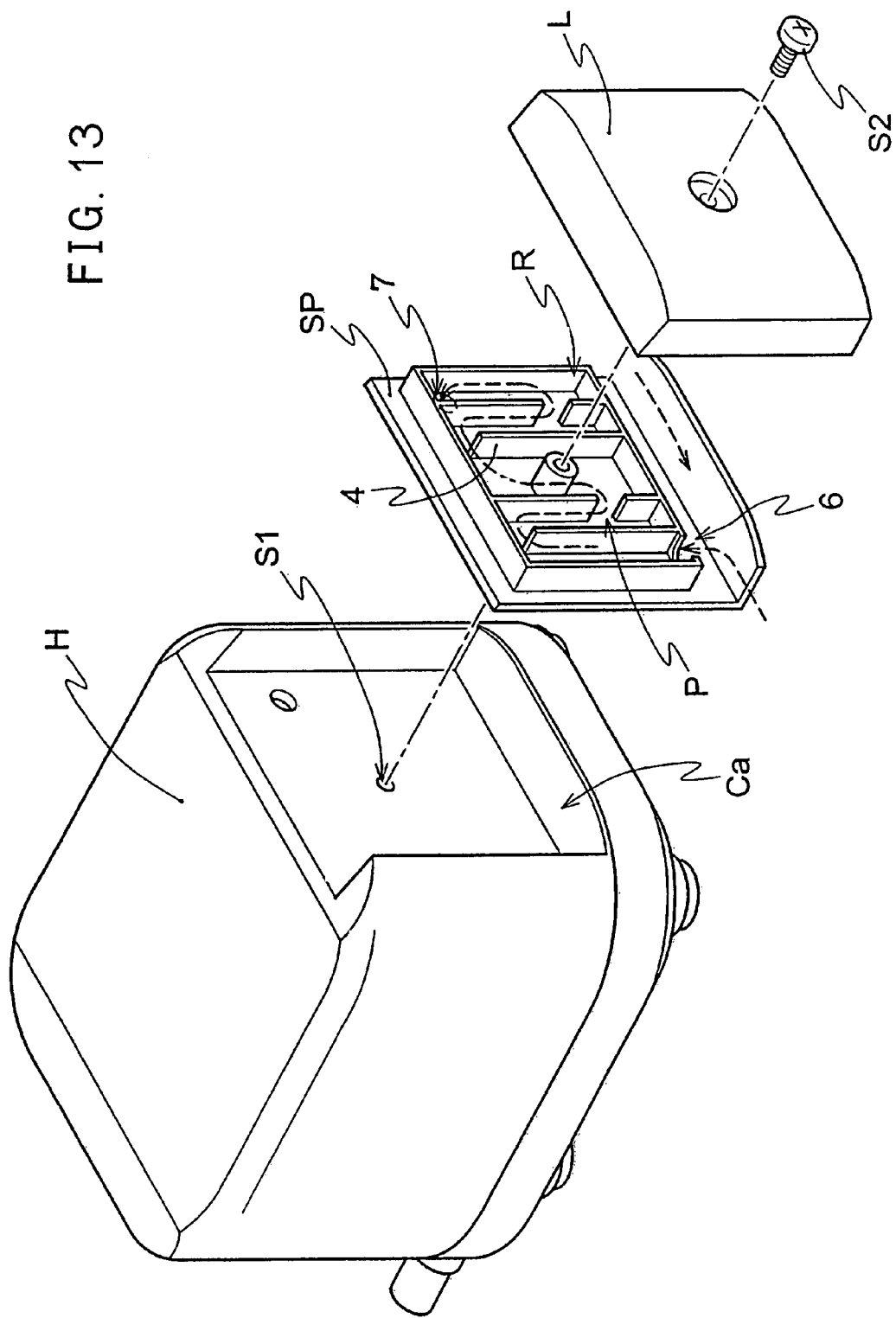
FIG. 13 is an illustrative view of an air pump to which the dust collecting mechanism related to another mode of the present invention is provided.
Figure 16:
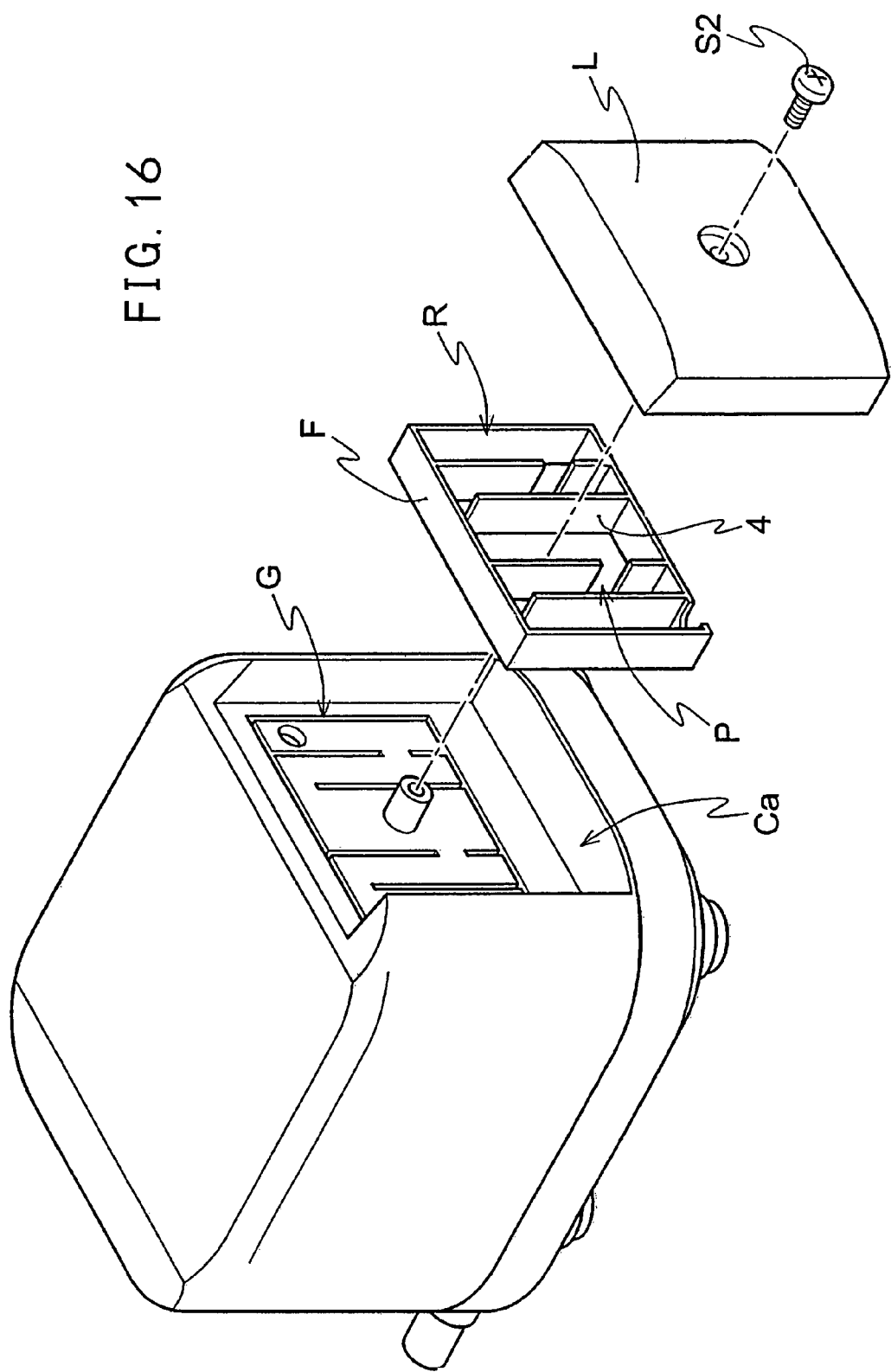
FIG. 16 is an illustrative view of an air pump to which the dust collecting mechanism related to yet another mode of the present invention is provided.
Figure 17:
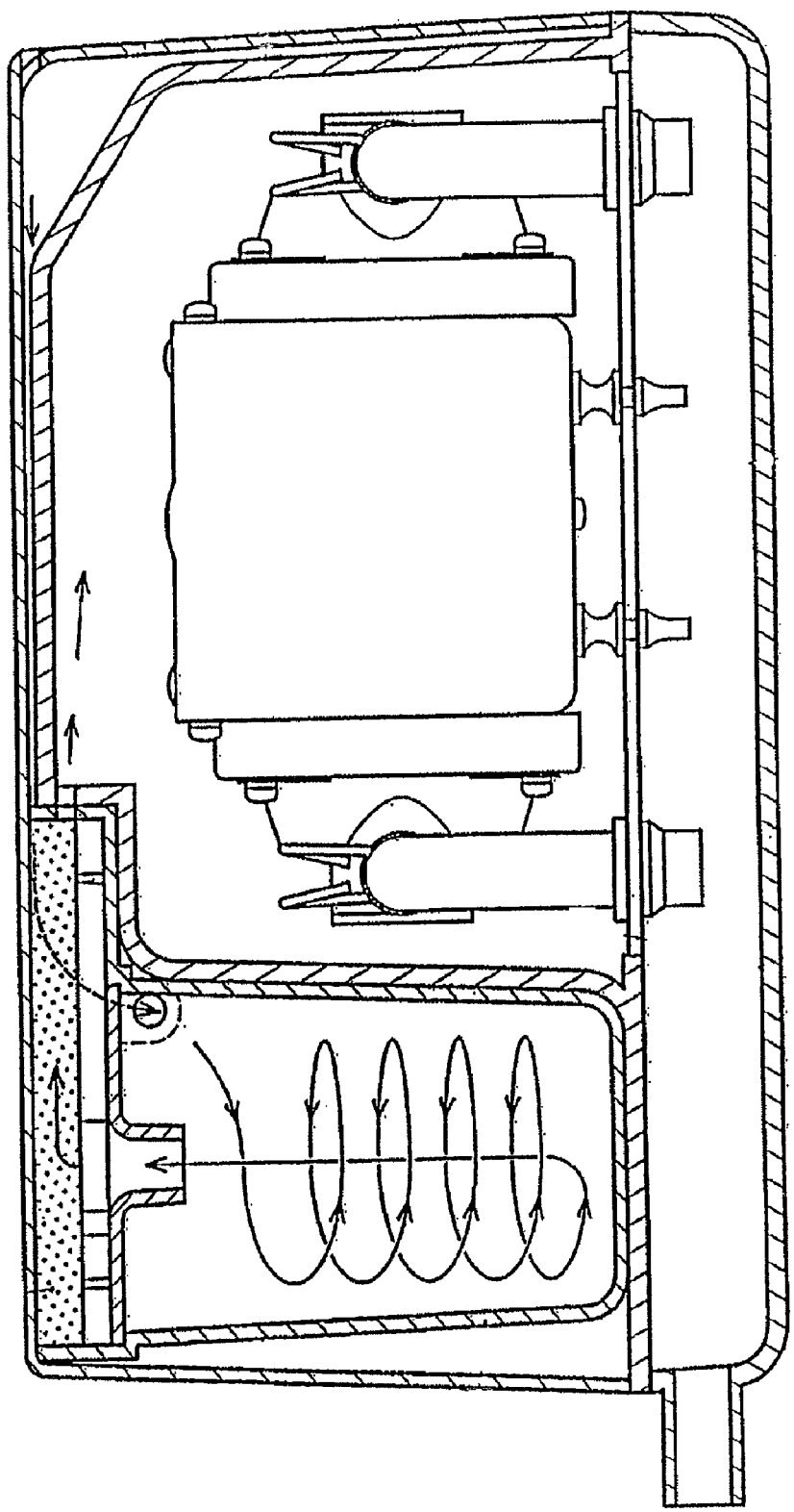
FIG. 17 is an illustrative view showing an example of a conventional air pump.
Figure 18:
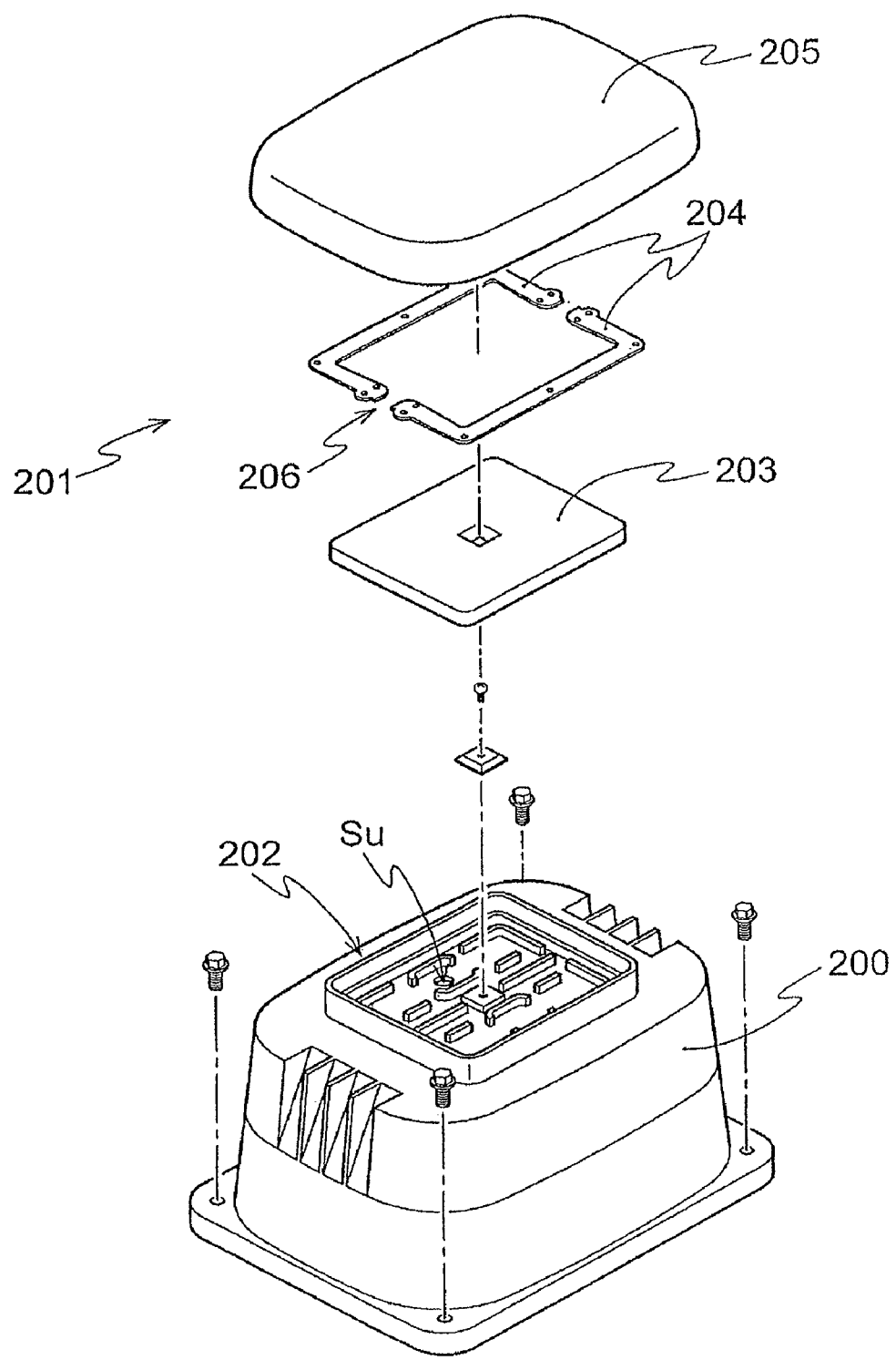
FIG. 18 is an illustration view showing another example of a conventional air pump.

The electromagnetic vibrational air pump of a mode of the present invention is illustrated below in detail referring to the attached drawings. FIG. 1 is an illustrative view showing an electromagnetic vibrational air pump to which the dust collecting mechanism related to the embodiment of the present invention is applied; FIG. 2 is a side illustrative view showing an example of the dust collecting mechanism of the present invention; FIG. 3 is a top illustrative view showing another example of the dust collecting mechanism of the present invention; FIG. 4 is a top illustrative view showing still another example of the dust collecting mechanism of the present invention; FIG. 5 is a top illustrative view showing yet another example of the dust collecting mechanism of the present invention; FIG. 6 is a top illustrative view showing yet another example of the dust collecting mechanism of the present invention; FIG. 7 is a graph showing relation between flow rate and vortex quantity; FIG. 8 is a side illustrative view showing another example of the dust collecting mechanism of the present invention; FIG. 9 is a side illustrative view showing still another example of the dust collecting mechanism of the present invention; FIG. 10 is an illustrative view showing the concept of the dust collecting mechanism of the present inventive; FIG. 11 is an illustrative view showing a mode of a channel applied to the dust collecting mechanism of the present invention; FIG. 12 is an illustrative view of an air pump to which the dust collecting mechanism related to another mode of the present invention is provided; FIG. 13 is an illustrative view of an air pump to which the dust collecting mechanism related to still another mode of the present invention is provided; FIG. 14 is an illustrative view of an air pump to which the dust collecting mechanism related to yet another mode of the present invention is provided; FIG. 15 is an illustrative view of an air pump to which the dust collecting mechanism related to further other mode of the present invention is provided; and FIG. 16 is an illustrative view of an air pump to which the dust collecting mechanism related to yet another mode of the present invention is provided.

The dust collecting mechanism 10 (refer to FIG. 1) for an air pump 1 of the mode of the present invention is equipped with a housing H having a structure including an inner cover 3 and an outer cover 2. Further, space 5 is provided between the outside face of the inner cover 3 and the inside face of the outer cover 2. The inlet 6 and outlet 7 of fluid are provided in the space 5. A double filter system may be adopted for enhancing further dust collecting effect and in that case, it can be corresponded by providing a filter 12 on the upper portion of the air pump 1.

However, as shown in FIGS. 12 to 16, the dust collecting mechanism of the present invention is adequate only if barrier chamber R is provided at least one portion of the housing H (in the illustrated example, a concave portion Ca provided at the side plane of the housing H), and the inlet 6 and outlet 7 of fluid are provided at the barrier chamber R (refer to FIG. 13) and further, a plurality of cross walls 4 at which 1 or 2 or more of vent holes 4a are provided are arranged in the barrier chamber R. Accordingly, it is not essential that the housing H has a double structure.

In the example shown in FIG. 12, the barrier chamber R is demarcated by a plurality of the cross walls installed in the concave portion Ca of the housing H. Further, a lid L covering the barrier chamber R is detachably provided by a screw.

In the example shown in FIG. 13, the barrier chamber R is installed at the side plane of the concave portion Ca through a supporting plate SP, and after the side facing the side plane of the barrier chamber R is closed with the lid L, it is fixed by screwing a male screw S2 inserted from the surface side of the lid L with a female screw S1 provided at the side face of the concave portion Ca.

In the example shown in FIG. 14, the barrier chamber R is provided in the lid L that is installed at the side plane of the concave portion Ca through the supporting plate SP.

In the example shown in FIG. 15, the barrier chamber R is provided in a module M (a kind of cassette) that is detachably installed at the side plane of the concave portion Ca through the supporting plate SP.

In the example shown in FIG. 16, the barrier chamber R is provided in the lid L that is installed at a frame body F fitted in a groove G formed at the side plane of the concave portion Ca.

The dust collecting mechanism of the present invention is also preferably applied to those in which the housing H has a double structure or a semi double structure. Further, the double structure in the present invention is a concept that includes those in which the outside face of the inner cover 3 is partially covered with the inside face of the outer cover 2 (partially double structure) as shown in FIG. 10(a) and those in which the outside face of the inner cover 3 is perfectly covered with the inside face of the outer cover 2 (whole double structure) as shown in FIG. 10(b); therefore, it is different in this point from the structure of a filter (FIG. 10(c)) of conventional technology equipped with space C that is provided as a separate body from a pump main body.

In case of the above-mentioned dust collector 10 of FIGS. 1 to 6, a plurality of the cross walls 4 in which 1 or 2 or more of vent holes 4a are provided are arranged at the outside face of the inner cover 3 and the inside face of the outer cover 2. The thickness of the cross walls 4 is not limited to a specific thickness, but the volume of the channel P can be changed by changing the thickness of the cross walls 4 and further, the processing capacity of the dust collector can be also changed (FIGS. 12 to 16 are also similar).

As shown in FIG. 2, the positions of the vent holes 4a of at least adjacent cross walls 4 and 4 among a plurality of the cross walls 4 are different. Further, the space 5 provided between the outside face of the inner cover 3 and the inside face of the outer cover 2, a plurality of the cross walls 4 and the vent holes 4a demarcate the vent channel P of fluid.

Referring to FIG. 11, as the vent holes 4a of the present invention, for example, slit type (FIGS. 11(a) and (b)) and tail tube type (FIG. 11(c)) are preferably adopted in addition to those in which a hole is merely perforated in the cross wall. Further, in case of the tail tube type vent holes 4a, for example, those with nearly circular shape (FIG. 11(d)) and those with nearly elliptical shape (FIG. 11(e)) can be adopted.

Further, in the mode of the present invention, 1 or 2 or more of opening portions 11 and drift portions 9 are provided at the vent channel P in the dust collecting mechanism 10 (refer to FIGS. 2 to 6) of an air pump 1 of the mode of the present invention and deflection plates 8 are provided at the drift portions 9 (refer to FIGS. 4 to 6). Further, FIGS. 3 to 6 are views viewing the composition of the cross walls 4 in the dust collecting mechanism 10 from a direction perpendicular to the paper plane (a view viewing the air pump 1 of FIG. 1 from top). However, the composition of the cross walls 4 of the dust collecting mechanism 10 shown in FIGS. 3 to 6 can function even at a horizontal state as a matter of course. For example, the composition of the cross walls 4 of FIG. 3 (namely, the composition of the cross walls 4 provided at the side portion of the air pump 1 of FIG. 1) can be also adopted to an area provided at the air filter 12 at the upper portion of the air pump 1 of FIG. 1.

Further, the dust collecting mechanism 10 for an electromagnetic vibrational air pump 1 of the mode of the present invention is equipped with the housing H having a double structure including the inner cover 3 and the outer cover 2 and the space 5 is provided between the outside face of the inner cover 3 and the inside face of the outer cover 2.

Further, a vent channel is demarcated in the space 5 (refer to the arrow mark of FIG. 1).

The opening portions 11 and the drift portions 9 can be also provided mutually facing as shown in FIG. 5 or FIG. 6.

Since the vent channel P exchanges heat between heat generated in the pump main body (refer to FIG. 1) and air passing the vent channel P, see directional flow arrows 6a and 6b, it exhibits one kind of cooling effect.

Further, the vent channel P exhibits also noise reduction effect.

Since the vent channel P of the air pump 1 of the present invention demarcates a zigzag channel by the above-mentioned composition as it were, it can generate turbulent flow by every timing at which fluid passes the vent channel P through the vent holes 4a. When fluid including dust passes the meandering zigzag vent channel P (by every passing), turbulent flow is generated to be sieved and heavier dust (minute foreign goods) falls down to the bottom portion of the vent channel P to be collected.

The turbulent flow is flow including the flow rate fluctuation of fluid having irregular and nonstationary continuous spectrum in space. Namely, the turbulent flow is generated by the difference of the flow rate of fluid in the vent channel P in the mode of the present invention and the larger the Reynolds number Re is, the more frequently the turbulent flow is generated.

$$Re = \rho v d / \mu = V d / \nu \qquad \text{(Formula 1)}$$

In the formula, $\rho$ is the density of fluid, $\mu$ is the viscosity of fluid, V is the flow rate in the vent channel, d is the diameter of the vent channel (when assumed as a pipe), and $\nu(=\mu/\rho)$ is the dynamic viscosity of fluid.

From the above-mentioned formula 1, the Reynolds number Re is proportional to the flow rate in the vent channel P and the diameter of the vent channel (when assumed as a pipe).

In the mode of the present invention, the housing H is a double structure including the inner cover 3 and the outer cover 2 and the space between the inner cover 3 and the outer cover 2 is functionally utilized for dust collecting action. Further, when deflection plates 8 and 8x (refer to FIGS. 4, 5 and 6) are put in the flow of the fluid, vortex is generated behind the flow and the present invention applies that the number and size of the vortex generated are proportional to the flow rate. However, the example shown in FIGS. 4 to 6 is only one example and the present invention is not limited to the composition.

The dust collecting mechanism of the present invention is further specifically illustrated below based on Embodiments but the present invention is not limited to Embodiments.

EMBODIMENT 1

As shown in FIG. 8, a container composed of 5 cells partitioned by the four cross walls or vessels 4 and linked by the vent holes 4a in which the 5 cells were alternately arranged was prepared. In FIG. 8, members shown by the reference code 8 were deflection plates and the deflection plates 8 were slanted by an angle $\theta$ ($\theta=25°$) against the cross vessels 4 so as to approach to the vent holes 4a.

Further, as a result of flowing air contaminated with dust from the inlet 6, it was cleared that there were fears of:

that the generation of vortex is little in the cell having the deflection plates 8;

that dust goes over the deflection plates 8; and that dust is easily accumulated in a cell where the outlet 7 was provided and the dust flows out from the outlet 7 to the pump.

EMBODIMENT 2

As shown in FIG. 9, a container composed of 5 cells partitioned by the four cross walls or vessels 4 and linked by the vent holes 4a in which the 5 cells were alternately arranged was prepared. In FIG. 9, members shown by the reference code 8 were deflection plates and both of the deflection plates 8b of upper side and the deflection plates 8b of lower side were slanted by an angle $\theta$ ($\theta=45°$) against the cross walls or vessels 4 so as to leave from the vent holes.

Further, as a result of flowing air contaminated with dust from the inlet 6, the deflection plates 8b were provided at the lower side, but they can be also respectively provided at the upper and lower portions in FIG. 9. It was cleared that the drifts 9 were generated at the lower side of the deflection plates 8b.

What is claimed is:

1. A dust collecting mechanism for an air pump, wherein an inlet and an outlet for fluid are provided at a barrier chamber provided in at least one portion of a housing,
a plurality of cross walls each provided with a vent hole are arranged adjacent to each other, and
the positions of the vent holes of the adjacent cross walls are different for each of the cross walls, wherein the plurality of cross walls and the vent holes move a vent channel of fluid in a zigzag direction to demarcate the obstacle of the vent channel, and
wherein deflection plates are provided slanted by an angle against the cross walls so as to leave the vent holes.

2. The dust collecting mechanism of claim 1, wherein the barrier chamber is detachably provided.

3. The dust collecting mechanism of claim 2, wherein the vent channel functions as a heat release means.

4. The dust collecting mechanism of claim 3, wherein the vent channel functions as a noise reduction means.

5. The dust collecting mechanism of claim 4, wherein the housing has a double structure comprising an inner cover and an outer cover, space being provided between the outside face of the inner cover and the inside face of the outer cover, and wherein both of the outside face of the inner cover and the inside face of the outer cover have wave curve shape.

6. The dust collecting mechanism of claim 1, wherein the vent channel functions as a heat release means.

7. The dust collecting mechanism of claim 1, wherein the vent channel functions as a noise reduction means.

8. The dust collecting mechanism of claim 1, wherein the housing has a double structure comprising an inner cover and an outer cover, space being provided between the outside face of the inner cover and the inside face of the outer cover, and wherein both of the outside face of the inner cover and the inside face of the outer cover have wave curve shape.

9. An air pump, equipped with a housing having a double structure comprising:
an inner cover and an outer cover, space being provided between the outside face of the inner cover and the inside face of the outer cover, further comprising a dust collecting mechanism according to claim 1,
wherein the inlet and outlet for fluid and the plurality of cross walls, at which the vent holes are provided, are arranged at the outside face of the inner cover and the inside face of the outer cover.

10. The air pump according to claim 9, wherein the barrier chamber is detachably provided.

11. The air pump according to claim 9, wherein the vent channel functions as a heat release means.

12. The air pump according to claim 9, wherein the vent channel functions as a noise reduction means.

13. The air pump according to claim 9, wherein both of the outside face of the inner cover and the inside face of the outer cover have wave curve shape.

* * * * *